3,000,694
ADDUCTS OF SF₄ AND METHOD FOR PREPARING THE SAME

William Channing Smith, Wilmington, Del., and Earl Leonard Muetterties, Chadds Ford, Pa., assignors to E. I. du Pont de Nemours and Company, Wilmington, Del., a corporation of Delaware
No Drawing. Filed Mar. 25, 1957, Ser. No. 647,981
12 Claims. (Cl. 23—14)

This invention relates to novel fluorine-containing compounds and to their synthesis.

Sulfur tetrafluoride is a highly reactive and versatile compound which can be prepared by methods described in the literature (Brown and Robinson, J. Chem. Soc., 1955, 3147–51). It can be used as an intermediate in the preparation of other fluorine-containing compounds. Thus, it can be reacted generally, as described in the pending application of William C. Smith, Serial No. 622,025, filed November 15, 1956, now Patent No. 2,859,245, with carbonyl compounds (that is, compounds containing a C=O group) to obtain compounds which have difluoromethyl, difluoromethylene and trifluoromethyl groups. Many of these reactions require high temperatures and long periods of time to obtain good yields of fluorinated products, conditions which can also lead to the formation of undesirable by-products. Sulfur tetrafluoride is also useful in forming the valuable gaseous dielectric sulfur hexafluoride by disproportionation at 400° C. and above as shown by the copending application 599,707, filed July 24, 1956, of Earl L. Muetterties, now Patent No. 2,883,267.

Sulfur tetrafluoride, as prepared, frequently contains other sulfur fluorides, for example, sulfur hexafluoride, which do not contribute to the fluorination reactions. A composition which will provide pure sulfur tetrafluoride in fluorination reaction is, therefore, desirable.

Sulfur tetrafluoride under normal conditions is a gas and its use in chemical reactions presents well-known difficulties which are inherent in reactions involving gaseous components. A nongaseous composition which will provide sulfur tetrafluoride in pure form has definite advantages. Such a nongaseous composition will also simplify handling and storing the normally-gaseous sulfur tetrafluoride.

The primary object of the present invention is therefore provision of new fluorine-containing compositions which are nongaseous but which will yield pure sulfur tetrafluoride for fluorination and other reactions.

The above-mentioned and yet further objects are attained in accordance with this invention by the synthesis of new compounds useful as sources of fluorine in fluorination reactions or as catalysts therein to permit operation of the reactions at lower temperatures and for shorter periods of time than heretofore possible. The products are complexes of sulfur tetrafluoride with binary inorganic fluorides which boil below 800° C. at 760 mm. of mercury pressure and which are chosen from hydrogen fluoride, boron trifluoride and the fluorides of elements of atomic number 15 or higher of groups IV-A and V-A of the periodic table. The elements of groups IV-A and V-A of the periodic table are those as set forth, for example, in Deming, "General Chemistry" (5th ed., Wiley, 1944).

The binary inorganic fluorides suitable for use in this invention have in common the property of forming ternary compounds with sodium fluoride and are essentially nonsalt-like in character. The central metal atoms of the binary inorganic fluorides suitable for use in preparing the compounds of this invention have in common an atomic structure in which there are unoccupied orbitals and which further have a maximum coordination number larger than the number of fluorine atoms bonded to the central metal atom. The term, "coordination number," is used here in a chemical sense as defined by Moeller, "Inorganic Chemistry," p. 143 (footnote), 1954 ed., published by John Wiley and Sons, Inc. It indicates the number of groups associated through electron pair bonding with a central metal ion in a coordination compound.

The number of sulfur tetrafluoride molecules present in the complex compound can be one or more and is a function of the binary inorganic fluoride. The complex compounds can be characterized by the formula $nSF_4 \cdot MF_x$, where M is hydrogen, boron or an element of groups IV-A and V-A of atomic number 15 or higher which forms a binary fluoride boiling below 800° C. at 760 mm.; $n$ is a whole number whose value is from one to three inclusive and $x$ is a whole number whose value is the valence of M.

The elements whose fluorides are operable in forming the adducts of this invention are hydrogen, boron, phosphorus, germanium, arsenic, tin and antimony. A preferred group of complexes of this invention are those obtained from sulfur tetrafluoride and hydrogen fluoride, boron trifluoride, phosphorus pentafluoride, germanium tetrafluoride, arsenic trifluoride, arsenic pentafluoride and antimony pentafluoride. This group of complexes is preferred because of stability, availability of the binary inorganic fluorides or ease of preparation.

The molecular addition compounds of this invention are generally crystalline colorless solids which fume on exposure to air. They react vigorously with water and with compounds which contain readily replaceable hydrogen atoms, for example alcohols and amines. They must, therefore be stored under anhydrous conditions, preferably in containers with corrosion-resistant linings, for example, stainless steel or platinum or in containers made of unreactive material such as polytetrafluoroethylene resin.

The stability and vapor pressure of the complexes vary considerably and are dependent on the binary inorganic fluoride from which the complex is prepared. Complexes derived from sulfur tetrafluoride and boron trifluoride or antimony pentafluoride are stable at room temperature and atmospheric pressure. Others, such as those derived from sulfur tetrafluoride and arsenic trifluoride, are somewhat dissociated at ordinary temperatures and are therefore preferably stored at low temperatures, for example, 0° C. or lower. At these low temperatures they can be kept without change for prolonged periods. Complexes obtained from high boiling inorganic fluorides will, when heated or placed under reduced pressure, yield pure sulfur tetrafluoride which can be condensed in containers cooled with a solid carbon dioxide-acetone solution or can be used directly in fluorination reactions.

The molecular compounds of this invention can be prepared by direct mixing of the binary inorganic fluoride with sulfur tetrafluoride followed by separation of the solid crystalline adduct, the mixture being cooled if necessary to effect crystallization.

The molar ratio of reactants used in the process is not critical. For optimum results, that is, maximum yield of adduct, sulfur tetrafluoride is used in excess. Preferably the molar ratio of sulfur tetrafluoride to binary inorganic fluoride will not be less than 1:1 or more than 4:1 and will be determined by the number of moles of sulfur tetrafluoride with which the inorganic binary fluoride can combine.

The reaction can be conducted in a batch process or in a continuous flow process. In a batch process a closed vessel is used which is capable of withstanding moderate pressure and whose inner surface is composed of material resistant to chemical attack by hydrogen fluoride. The air in the reaction chamber is preferably displaced with an inert gas, for example, nitrogen, before the reactants are charged into the chamber. The reaction vessel is cooled by any suitable means to −50° C. or lower and charged with a predetermined amount of one of the reactants. The order in which the reactants are charged into the chamber is not critical and is determined by convenience of manipulation. If the binary inorganic compound is non-gaseous it is preferably charged into the reaction vessel first and is then followed by sulfur tetrafluoride. If the binary inorganic compound is a gas boiling below, for example, about −40° C., the reaction vessel is generally charged with sulfur tetrafluoride first followed by the inorganic compound.

The temperature at which the reaction is conducted will be determined by the reactants and will range from as low as −20° C. to as high as 500° C. The reaction usually proceeds rapidly and can, therefore, be completed in a short time. However, the reactants can be kept in the reaction chamber for any desired length of time, for example, as long as 15 hours, to assure completeness of the reaction. The contents of the chamber can be mixed during the reaction period by suitable means such as mechanical stirring or shaking. The pressure during the reaction is autogenous and is not critical. It generally lies between 5 and 50 atmospheres.

In a continuous flow process the binary inorganic fluoride, if gaseous, is passed into a reaction tube through which sulfur tetrafluoride gas is also passing. Alternatively the reaction tube can be charged with a nongaseous inorganic binary fluoride and sulfur tetrafluoride gas passed over it. The reaction tube can be heated if necessary to effect reaction. In either method the molecular addition compound is collected in a trap connected to the exit end of the reaction tube and cooled, for example, with a solid carbon dioxide-acetone solution.

The following examples will illustrate the new compounds of this invention and the methods of preparing them.

*Example 1.—$SF_4 \cdot BF_3$*

A reaction vessel (capacity 145 ml.), capable of withstanding pressure and lined with stainless steel, was evacuated, cooled to −78° C. and charged with 66 g. (0.60 mole) of sulfur tetrafluoride and 26.0 g. (0.383 mole) of boron trifluoride. The bomb was closed and heated with shaking at autogenous pressure at 100° C. for 2 hours, 200° C. for 4 hours, 300° C. for 6 hours and finally at 350° C. for 2 hours. The bomb was cooled, opened and 60.8 g. of white crystalline solid was removed. The solid fumed on exposure to the atmosphere but was stable when stored under anhydrous conditions at room temperature in bottles made of "Teflon"-tetrafluoroethylene resin. Analysis of the material showed that it was composed of one mole of sulfur tetrafluoride and one mole of boron trifluoride.

*Analysis.*—Calc'd for $SF_4 \cdot BF_3$: F, 75.8%; S, 18.2%. Found: F, 73.53%; S, 18.62%.

*Example 2.—$SF_4 \cdot SbF_5$*

A bomb similar to that described in Example 1 was charged with 21.6 g. of antimony pentafluoride, cooled to −78° C. and charged with 44.0 g. of sulfur tetrafluoride. It was closed and heated at 100° C. for 2 hours, 200° C. for 1 hour and 250° C. for 12 hours. There was obtained 21.0 g. of the 1:1 adduct, $SF_4 \cdot SbF_5$, a white solid which fumed in air and reacted vigorously with water.

In another experiment conducted with similar quantities of reactants, the bomb was heated at 100° C. for 2 hours, 200° C. for 4 hours and 300° C. for 8 hours. There was obtained 18.2 g. of the adduct, $SF_4 \cdot SbF_5$.

*Example 3.—$SF_4 \cdot PF_5$*

A bomb similar to that described in Example 1 was evacuated, cooled to −78° C. and charged with 55 g. (0.50 mole) of sulfur tetrafluoride. The bomb was placed behind a barricade, connected to a cylinder of phosphorus pentafluoride and the pentafluoride gradually fed into the bomb. As the addition proceeded the temperature inside the bomb rose from −45° C. to 50° C. and then dropped to 10° C. At this point a total of 78 g. of phosphorus pentafluoride had been added. The bomb was closed and heated with shaking at 100° C. for 2 hours, 200° C. for 4 hours, 300° C. for 6 hours and finally at 350° C. for 2 hours. The bomb was cooled, opened and 38.6 g. of white crystalline solid was obtained. The solid had appreciable vapor pressure at room temperature (23–25° C.) and fumed vigorously on exposure to atmospheric moisture. It was stored satisfactorily as described in Example 1. It was shown by analysis to be $SF_4 \cdot PF_5$. Yield, 30.5%.

*Analysis.*—Calc'd for $SF_4 \cdot PF_5$: F, 75.10%; S, 12.60%; P, 12.20%. Found: F, 72.69%, 73.12%; S, 14.05%, 13.76%; P, 12.90%, 13.00%.

In a second experiment the bomb was charged with the reactants and agitated for 18 hours without external heating. In this case a 73% yield of product was obtained.

*Example 4.—$SF_4 \cdot AsF_3$*

Approximately equimolar ratios of gaseous sulfur tetrafluoride and arsenic trifluoride were condensed in a capillary tube which was then sealed. The nuclear magnetic resonance spectrum of the homogeneous liquid in the capillary tube indicated that association or formation of a complex had occurred. The complex has the formula $SF_4 \cdot AsF_3$.

Other complex compounds which can be obtained include those from hydrogen fluoride with the formula $SF_4 \cdot HF$; arsenic pentafluoride with the formula, $SF_4 \cdot AsF_5$; and germanium tetrafluoride with the formula, $2SF_4 \cdot GeF_4$. The latter compound is a white crystalline solid which fumes on exposure to moist air and can be stored satisfactorily as described in Example 1. This compound was shown by analysis to contain 2 moles of sulfur tetrafluoride for each mole of germanium tetrafluoride.

*Analysis.*—Calc'd for $2SF_4 \cdot GeF_4$: F, 62.60%; S, 17.5%. Found: F, 64.10%; S, 18.5%.

The chemical structure of the complexes has not been rigorously established. On the basis of data presently available it appears that they are best represented as addition compounds.

The addition compounds of this invention are generically useful as fluorinating agents and as catalysts in fluorination reactions. The adduct may be prepared separately and added to the reaction or it may be prepared in situ as disclosed in the above-mentioned pending application Serial No. 622,025. For example, in the preparation of difluorodiphenylmethane from benzophenone and sulfur tetrafluoride the addition of hydrogen fluoride in sufficient amount to form a catalytic quantity of the sulfur tetrafluoride-hydrogen fluoride adduct resulted in a yield of 97% of product compared to a yield of 10% without the catalyst. When phosphorus pentafluoride was used in sufficient amount to form a catalytic quantity of $SF_4 \cdot PF_5$ the yield of difluorodiphenylmethane was 49.2%, that is, approximately five times that of the control.

The sulfur tetrafluoride/phosphorus pentafluoride addition compound of Example 3 reacted vigorously with acetone at room temperature to yield a fluorine-containing compound. Sulfur tetrafluoride and phosphorus pentafluoride individually do not fluorinate acetone at room temperature.

The adducts prepared from nongaseous binary inorganic fluorides are also useful as a source of pure sulfur tetrafluoride. For example, when the adduct, $SF_4 \cdot SbF_5$, is warmed gently pure sulfur tetrafluoride is released and can be collected in a trap cooled with solid carbon dioxide-acetone solution.

Since various modifications in our invention will be obvious to those skilled in the chemical arts, we propose to be bound solely by the appended claims.

The embodiments of the invention in which an exclusive property or privilege is claimed are defined as follows:

1. A compound of the formula $nSF_4 \cdot MF_x$, wherein M is a member of the group consisting of hydrogen, boron and an element of Groups IV-A and V-A of an atomic number of at least 15 and which forms a binary fluoride boiling below 800° C. at 760 mm. of mercury pressure, $n$ is a whole number from 1 to 3, inclusive, and $x$ is a whole number whose value is the valence of M.

2. $SF_4 \cdot BF_3$.
3. $SF_4 \cdot SbF_5$.
4. $SF_4 \cdot PF_5$.
5. $SF_4 \cdot AsF_3$.
6. $2SF_4 \cdot GeF_4$.

7. The process which comprises (1) reactively contacting sulfur tetrafluoride with a binary fluoride of an element selected from the class consisting of hydrogen, boron, and elements of Groups IV-A and V-A of the Periodic Table having atomic numbers greater than 14, said binary fluoride boiling at less than 800° C. at 760 mm. of mercury pressure, and (2) subsequently recovering an adduct of sulfur tetrafluoride from the reaction mixture.

8. The process which comprises reactively contacting sulfur tetrafluoride and boron trifluoride and subsequently recovering an adduct of sulfur tetrafluoride from the reaction mixture.

9. The process which comprises reactively contacting sulfur tetrafluoride and antimony pentafluoride and subsequently recovering an adduct of sulfur tetrafluoride from the reaction mixture.

10. The process which comprises reactively contacting sulfur tetrafluoride and phosphorus pentafluoride and subsequently recovering an adduct of sulfur tetrafluoride from the reaction mixture.

11. The process which comprises reactively contacting sulfur tetrafluoride and arsenic trifluoride and subsequently recovering an adduct of sulfur tetrafluoride from the reaction mixture.

12. The process which comprises reactively contacting sulfur tetrafluoride and germanium tetrafluoride and subsequently recovering an adduct of sulfur tetrafluoride from the reaction mixture.

References Cited in the file of this patent

N. Bartlett and P. L. Robinson: Chemistry and Industry, Nov. 17, 1956, pp. 1351–2.

Schumb: "Preparation and Properties of Sulfur Hexafluoride," Ind. and Eng. Chem., Mar. 1947, pages 421 to 423.